(12) United States Patent
Murphy et al.

(10) Patent No.: US 6,244,976 B1
(45) Date of Patent: Jun. 12, 2001

(54) INTEGRAL SOLE PLATE AND HOSEL FOR A GOLF CLUB HEAD

(75) Inventors: James M. Murphy, Laguna Nigel; Herbert Reyes, Oceanside; D. Clayton Evans, San Marcos; J. Andrew Galloway, Escondido; Daniel R. Jacobson, San Diego, all of CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

(21) Appl. No.: 09/474,927

(22) Filed: Dec. 29, 1999

Related U.S. Application Data

(63) Continuation-in-part of application No. 08/958,723, filed on Oct. 23, 1997, now Pat. No. 6,010,411.

(51) Int. Cl.[7] .................................................. A63B 53/04
(52) U.S. Cl. ......................... 473/305; 473/344; 473/345
(58) Field of Search ................................. 473/335, 336, 473/345, 347, 348, 349, 305, 344

(56) References Cited

U.S. PATENT DOCUMENTS

| | | |
|---|---|---|
| 1,658,581 | 2/1928 | Tobia . |
| 3,810,621 * | 5/1974 | Mills . |
| 4,496,153 | 1/1985 | Kochevar . |
| 4,502,687 | 3/1985 | Kochevar . |
| 4,667,963 | 5/1987 | Yoneyama . |
| 4,778,722 | 10/1988 | Yamamura et al. . |
| 4,793,616 | 12/1988 | Fernandez . |
| 4,874,171 | 10/1989 | Ezaki et al. . |
| 5,009,425 | 4/1991 | Okumoto et al. . |
| 5,190,290 | 3/1993 | Take . |
| 5,228,694 | 7/1993 | Okumoto . |
| 5,242,168 | 9/1993 | Aizawa . |
| 5,262,118 | 11/1993 | Fukushima et al. . |
| 5,318,296 | 6/1994 | Adams et al. . |
| 5,350,556 | 9/1994 | Abe . |
| 5,377,986 | 1/1995 | Viollaz et al. . |
| 5,429,365 | 7/1995 | McKeighton . |
| 5,485,998 | 1/1996 | Kobayashi . |
| 5,489,098 | 2/1996 | Gojny et al. . |
| 5,501,459 * | 3/1996 | Endo . |
| 5,533,728 | 7/1996 | Pehoski . |
| 5,547,427 | 8/1996 | Rigal et al. . |
| 5,593,356 | 1/1997 | Takeda . |
| 5,658,207 * | 8/1997 | Aizawa et al. ........................ 473/345 |
| 5,672,120 | 9/1997 | Ramirez . |
| 5,674,133 | 10/1997 | Chang . |
| 5,779,560 | 7/1998 | Buck . |
| 5,985,197 * | 11/1999 | Nelson et al. ........................ 264/221 |
| 5,989,134 | 11/1999 | Antonious . |

FOREIGN PATENT DOCUMENTS 2 292 33   4/1994  (GB) .

* cited by examiner

*Primary Examiner*—Jeanette Chapman
*Assistant Examiner*—Stephen L. Blau
(74) *Attorney, Agent, or Firm*—Michael A. Catania

(57) ABSTRACT

A golf club head having a sole plate and hosel integral piece is disclosed herein. The integral piece may be composed of a metal material for with a golf club head having a composite body. The integral piece also improves the consistency of the loft and lie parameters of a golf club head. The hosel may be formed with the sole plate, or the hosel may be connected to the sole plate. The integral piece may also have a polymer sleeve thereabout to assist in reducing the stress at the tip end of a shaft inserted into the hosel.

7 Claims, 5 Drawing Sheets

INTEGRAL SOLE PLATE AND HOSEL FOR A GOLF CLUB HEAD

CROSS REFERENCES TO RELATED APPLICATIONS

This application is a continuation-in-part application of U.S. patent application No. 08/958,723, filed on Oct. 23, 1997, U.S. Pat. No. 6,010,411, which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention relates to a golf club head. More specifically, the present invention relates to an integral sole plate and hosel that is attached to the golf club head.

2. Description of the Related Art

The placement of the tip end of a shaft in a golf club head has an effect on the performance of the golf club. In most metal woods with hollow interiors, the tip end has been inserted in internal hosels that are integral with the body of the metal wood. Although providing structural integrity, such internal hosels may add unnecessary weight to the club head, or otherwise affect the center of gravity of the golf club. Further, depending on manufacturing tolerances, such internal hosels may lead to inconsistencies in the loft and lie design parameters. Thus, loft angles may be off as much as one and a half degrees.

In composite golf club heads, the shaft has been attached to the club head through an external hosel, also composed of the composite material. What is needed is a means for connection of the shaft to a club head without the addition of weight. Additionally, a means to increase the consistency of loft and lie parameters is required to increase a golfer's performance.

BRIEF SUMMARY OF THE INVENTION

One aspect of the present invention is a golf club head. The golf club head has a body having a hollow interior, a face, a sole, and a crown having a crown aperture therein. The sole has a recess and an sole aperture. A sole plate has an integral hosel tube projecting therefrom. The sole plate is disposed within the recess of the sole. The hosel tube extends through the sole aperture and is disposed in relation to the crown aperture.

The sole plate may be substantially flat and have a thickness in the range of 0.01 inches to 0.50 inches. The sole plate and the integral hosel tube may be composed of a metal such as stainless steel, titanium, or the like. Alternatively, the sole plate and the integral hosel tube may be composed of an injection molded polymer. The body may be composed of a composite material and the sole plate and integral hosel tube may be composed of a material having a density greater than the composite material. The composite body may have a weight strip or a loaded film embedded therein. Alternatively, the body may be composed of a metal selected from the group consisting of titanium, stainless steel, amorphous metal, titanium alloys, and combinations thereof.

The sole plate and integral hosel tube weigh in the range of 10 to 50 grams The sole plate may be bonded to the sole with an epoxy adhesive, a polyurethane adhesive, a modified acrylic adhesive, or the like The integral hosel tube may be threadingly engaged with the sole plate.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
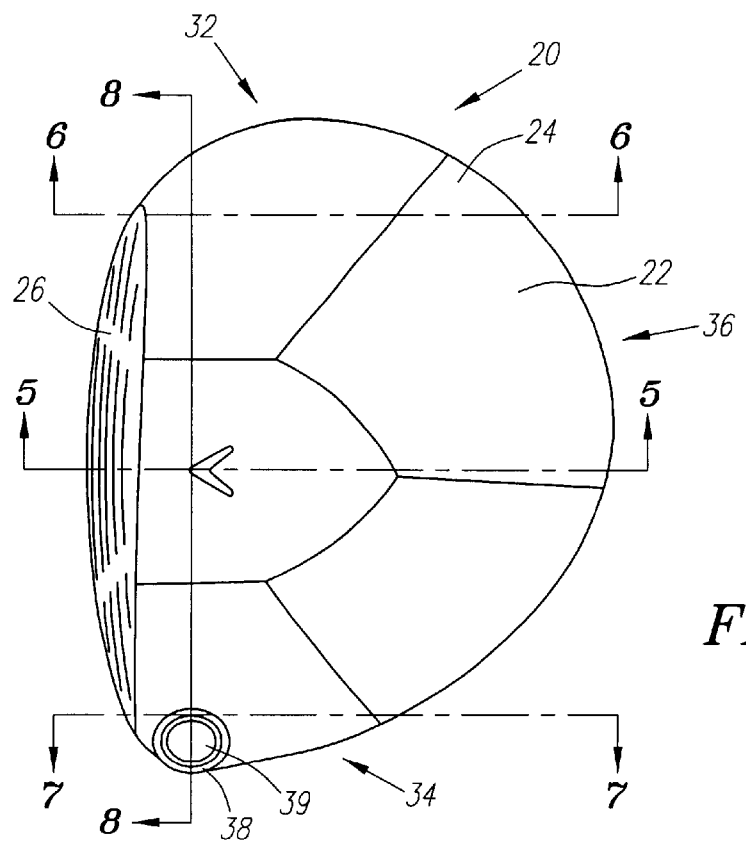
FIG. 1 is a top plan view of a golf club head of the present invention.
Figure 2:
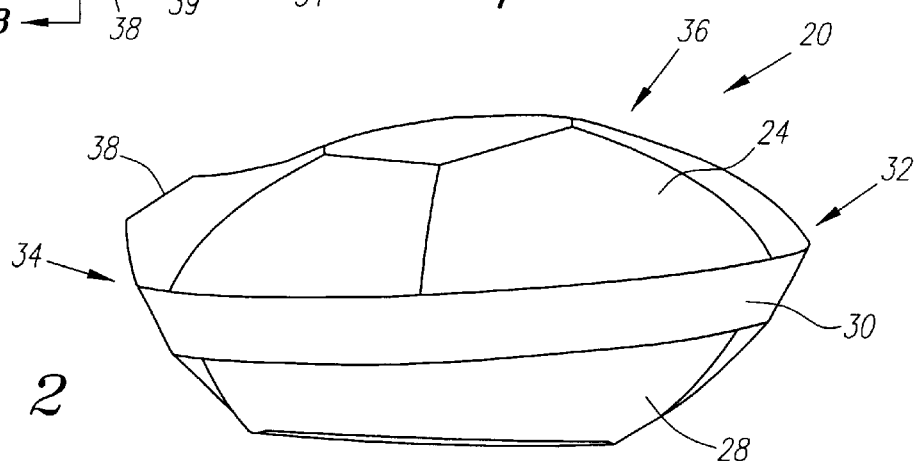
FIG. 2 is a rear view of the golf club head of FIG. 1.
Figure 3:
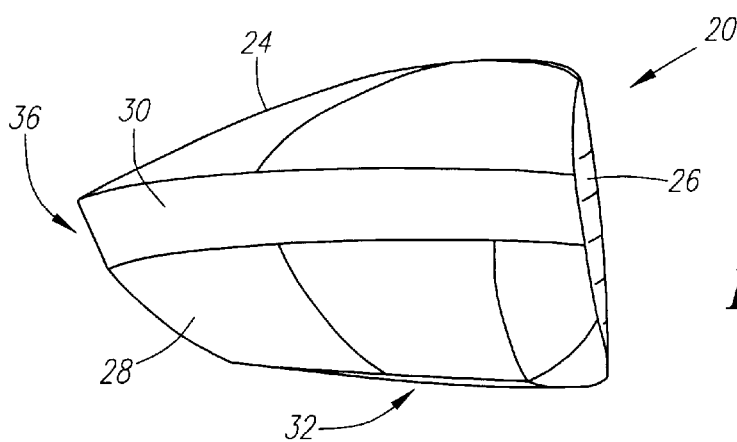
FIG. 3 is a toe end view of the golf club head of FIG. 1.
Figure 4:
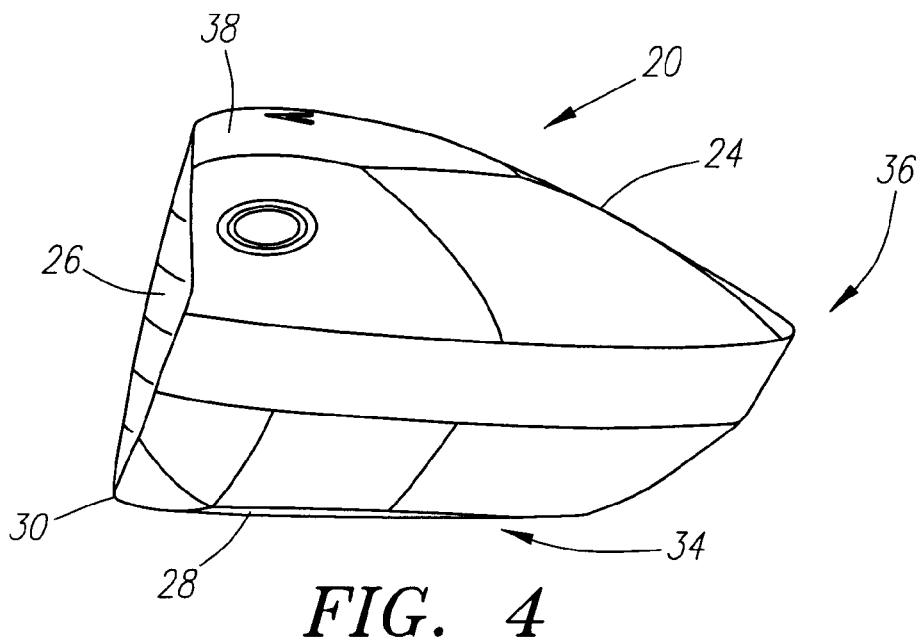
FIG. 4 is a heel end view of the golf club head of FIG. 1.

As shown in FIGS. 1–4, a golf club head of the present invention is generally designated 20. The club head 20 may be a fairway wood or a driver. The club head 20 has a body 22 that is preferably composed of a composite material such as plies of carbon pre-peg sheets. Alternatively, the body 22 may be composed of a material selected from the group of titanium, stainless steel, amorphous metals (such as Liquidmetal), titanium alloys, and other similar materials. The body 22 has a crown 24, a face 26, a sole 28 and a ribbon 30 juxtaposed by the sole 28 and the crown 24. The ribbon 30 generally extends from a toe end 32 to a heel end 34. The ribbon 30 generally begins at one end of the face 26 and ends at an opposite end of the face 26. A rear 36 of the body 22 is opposite the face 26 and is defined by portions of the ribbon 30, the crown 24 and the sole 28. The ribbon 30 increases the volume of the club head 20 and also assists in creating a club head 20 with a higher moment of. Also, at the heel end 34 of the club head 20 is a hosel 38 with an opening 39 for inserting a shaft therein.

Figure 5:
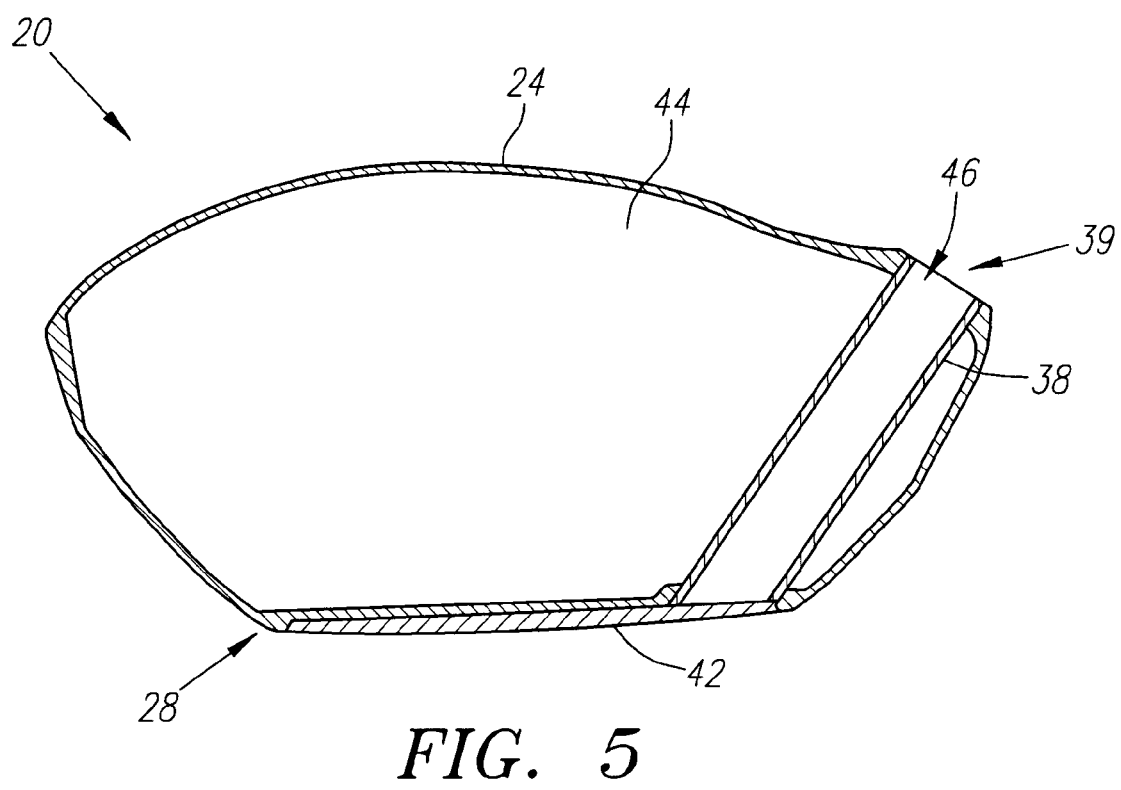
FIG. 5 is a cross-sectional view of the golf club head of FIG. 1 along line 5—5.

As shown in FIG. 5, the club head has a sole plate 42 attached to the sole 28 of the body 22. The sole plate 42 is integral with the hosel tube 38 forming a sole plate and hosel integral piece 43 that is incorporated into the club head 20. The hosel 38 lies within the hollow interior 44 of the club head 20. The hosel 38 extends from the sole plate 42 to the shaft opening 39 in the crown 24. The hosel 38 has a passageway 46 for insertion of a tip end of a shaft therethrough. The other end of the hosel is blocked by the sole plate 42. Preferably, the club head 20 has a hollow interior 44, however, the light weight of a composite body 22 would allow for numerous manipulations in placement of weight, foam, sound enhancing devices and the like within the hollow interior 44.

Figure 6:
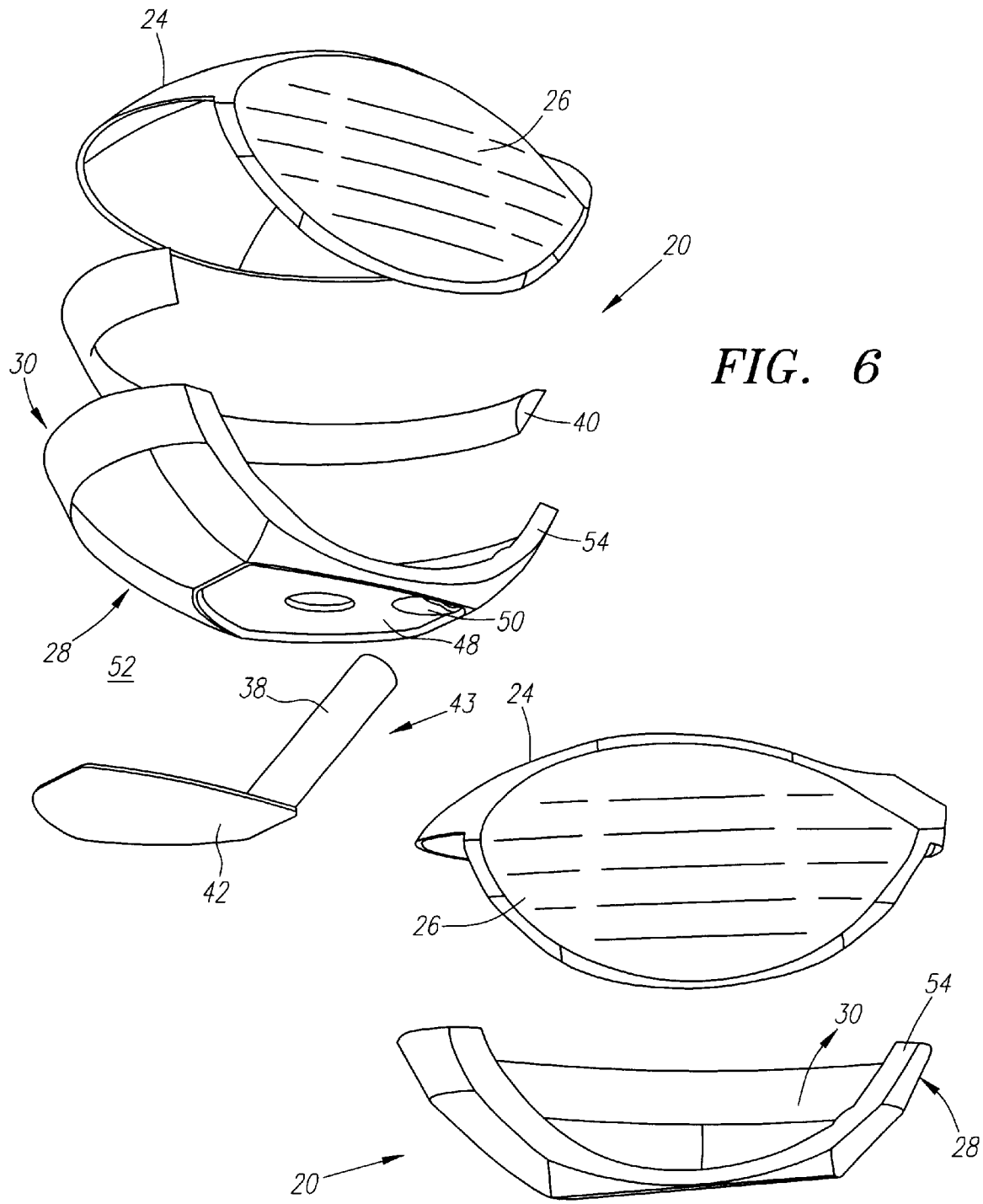
FIG. 6 is an exploded view of the golf club head of the present invention.
Figure 7:
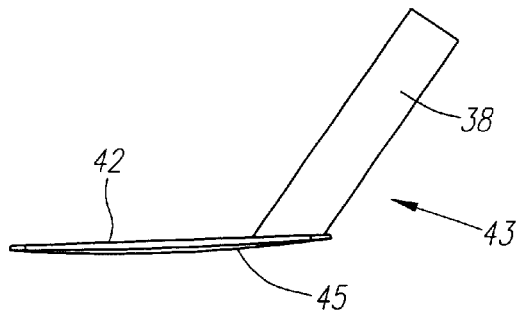
FIG. 7 is an exploded view of an alternative embodiment of the golf club head of the present invention.
Figure 8:
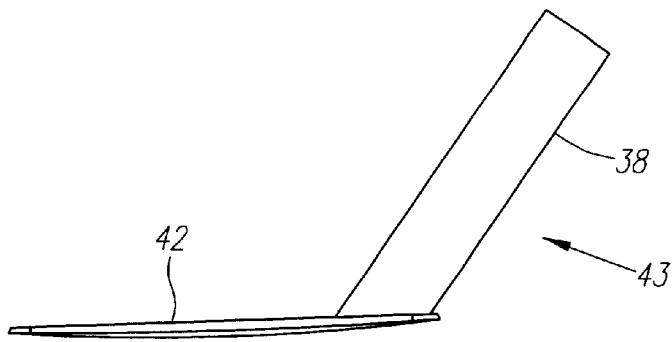
FIG. 8 is an isolated front plan view of an integral sole plate and hosel of the present invention. plan view of the integral sole plate and hosel of the present invention.
Figure 9:
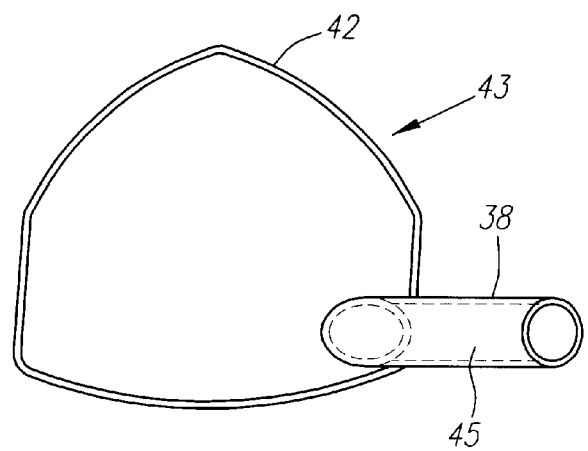
FIG. 9 is an isolated top plan view of the integral sole plate and hosel of the present invention.
Figure 10:
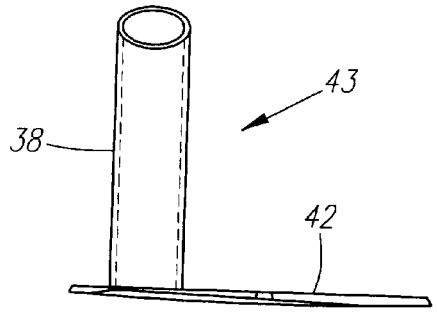
FIG. 10 is an isolated rear plan view of the integral sole plate and hosel of the present invention.
Figure 11:
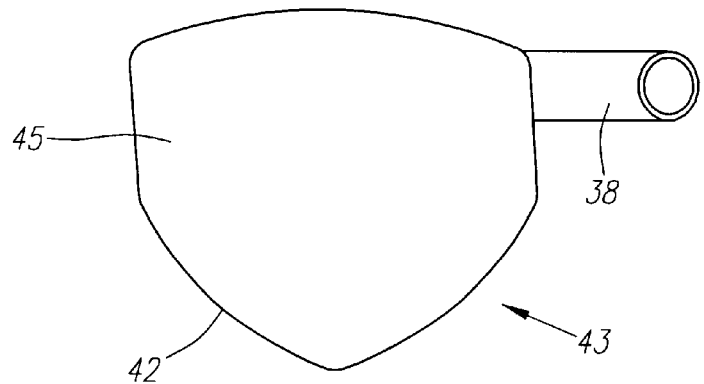
FIG. 11 is an isolated bottom plan view of the integral sole plate and hosel of the present invention.

As shown in FIG. 6, the sole plate hosel integral piece 43 is inserted into a sole cavity 48 that is shaped to accommodate the sole plate 42. The hosel 38 is inserted through a hosel aperture 50 to connect with the shaft opening 39 for placement of a shaft therethrough. A sole plate aperture 52 allows for access to the hollow interior 44 through the sole 28. The golf club head 20 may be fabricated as described in co-pending U. S. patent application No. 09/474,670, filed Dec. 29, 1999 and entitled A Composite Golf Club Head And Method Of Manufacturing, which is hereby incorporated in its entirety. In a preferred embodiment, the sole plate and hosel integral piece 43 is composed of a stainless steel material. As shown in FIG. 7, the flat exterior surface 45 of the sole plate 42 will rest on the green forming the very bottom of the golf club head 20.

As shown in FIGS. 8–11, the sole plate 42 and hosel 38 are integral in that a single integral piece is inserted into a body 22 of a club head 20. The hosel 38 may be cast with the sole plate 42, welded or brazed to the sole plate 42, or even threadingly engaged with the sole plate 42. Alternatively, the hosel 38 may be adhesively bonded to the sole plate 42. If the sole plate and hosel integral piece 43 is composed of a polymer, the hosel may be chemically adhered or bonded to the sole plate 42.

The hosel 38 lies at an angle of 95 degrees to 135 degrees relative to the sole plate 42. If the sole plate and hosel integral piece 43 is composed of a stainless steel material, the weight may range from 25 grams to 50 grams. The main attribute of the sole plate and hosel integral piece 43 is its ability to provide club heads with consistent loft and lie design parameters since the angle of the hosel 38, and thus the angle of the shaft relative to the striking plate 26, is set due to the connection of the hosel 38 to the sole plate 42. This accuracy is further enhanced by the consistency of the sole plate aperture 52 and the sole cavity 48. This consistency in loft angles allows for enhanced performance since manufacturers may produce golf clubs with more accurate loft angles. The sole plate and hosel integral piece 43 may also be used as a means to lower the center of gravity, a means to maintain a shaft within the club head, or both.

Figure 12:
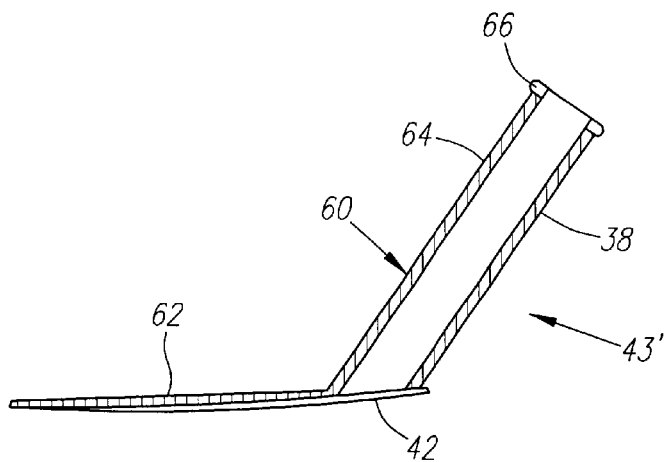
FIG. 12 is an isolated side view of an alternative embodiment of an integral sole plate and hosel of the present invention.
Figure 13:
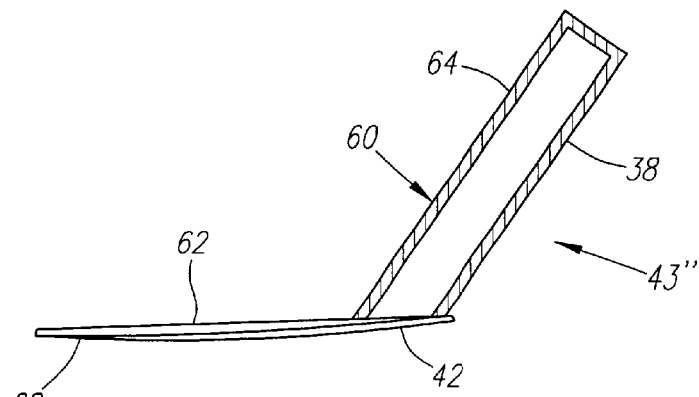
FIG. 13 is an isolated side view of an alternative embodiment of an integral sole plate and hosel of the present invention.
Figure 14:
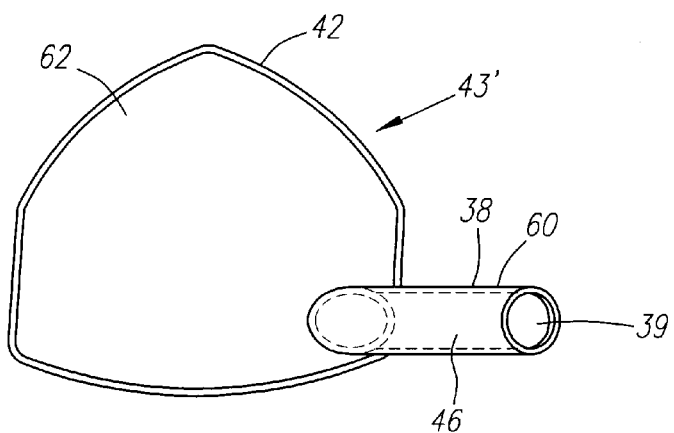
FIG. 14 is an isolated top plan view of an alternative embodiment of an integral sole plate and hosel of the present invention.

FIGS. 12–14 illustrate an alternative embodiment of the sole plate and hosel integral piece. In this embodiment, a sole plate and hosel integral piece 43' has a polymer sleeve 60 about a metal sole plate and hosel integral piece 43. The polymer sleeve 60 may be composed of an injectable polymer. Thermoplastic polymers are preferred, however, injectable thermoset materials may be utilized for the polymer sleeve 60. As shown in FIG. 12, the polymer sleeve 60 has a sole plate portion 62 and a hosel portion 64. The sole plate portion 62 covers the top or interior surface of the sole plate 42, allowing the bottom or exterior metal surface of the sole plate 42 to be exposed for durability. The hosel portion 64 encompasses the hosel 38. The polymer sleeve 60 is molded as one piece and the sole plate and hosel integral piece 43 is inserted therein. A ferrule 68 may be attached to the top end of the hosel portion 68 of the polymer sleeve 60. Alternatively, the polymer sleeve 60 may be molded about the sole plate and hosel integral piece 43. A preferred polymer material is an ionomer material. The polymer sleeve 60 creates a sole plate and hosel integral piece 43' that is more easily bonded to the composite body 22. Further, the polymer material of the polymer sleeve 60 may be matched to the mechanical properties of the material of a shaft to reduce stress at the tip end of the shaft. Yet further, the polymer sleeve 60 assists in absorbing the force transmitted through the club head 20 during impact with a golf ball.

In an alternative embodiment shown in FIG. 13, the exterior surface of the sole plate 42 is covered by the polymer sleeve 60. This exterior surface portion 68 of the polymer sleeve 60 is either injected after placement of the metal sole plate and hosel integral piece 43, or the entire polymer sleeve 60 is molded about the sole plate and hosel integral piece 43. Both embodiments shown in FIGS. 12 and 13 may have graphics, including multicolor graphics, injected on the exterior surface of the sole plate 42 or the exterior surface 68 of polymer sleeve 60.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention:

1. A golf club head comprising:

a body composed of a composite material the body having a hollow interior, a face, a sole, and a crown, the crown having a crown aperture therein, the sole having a recess and a sole aperture;

a sole plate having an integral hosel tube projecting therefrom, the sole plate disposed within the recess of the sole and the hosel tube extending through the sole aperture and disposed in relation to the crown aperture, the sole plate and integral hosel tube composed of a stainless steel material having a density greater than the composite material; land a polymer sleeve attached to the sole plate and integral hosel tube.

2. The golf club head according to claim 1 wherein the sole plate is substantially flat having a thickness in the range of 0.01 inch to 0.50 inch.

3. The golf club head according to claim 1 wherein the sole has a surface and the recess of the sole lies inward from the surface, and the sole plate is planar with the surface of the sole.

4. The golf club head according to claim 1 wherein the composite body has a weight strip or a loaded film embedded therein.

5. The golf club head according to claim 1 wherein the integral hosel tube is positioned at an angle between 90 and 140 degrees relative to the sole plate.

6. The golf club head according to claim 1 wherein the integral hosel tube has a passageway with a diameter in the range of 0.300 to 0.500 inch.

7. The golf club head according to claim 1 wherein the sole plate and integral hosel tube weigh in the range of 30 to 50 grams.

* * * * *